(12) United States Patent
Thomas

(10) Patent No.: US 11,099,685 B2
(45) Date of Patent: Aug. 24, 2021

(54) SELECTIVE TOUCH SENSOR ACTIVATION FOR POWER SAVINGS

(71) Applicant: NVIDIA Corporation, Santa Clara, CA (US)

(72) Inventor: Jithin Thomas, Pune (IN)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 16/440,648

(22) Filed: Jun. 13, 2019

(65) Prior Publication Data

US 2020/0393948 A1   Dec. 17, 2020

(51) Int. Cl.
*G06F 3/0488* (2013.01)
*G06F 3/041* (2006.01)
*G06F 1/3234* (2019.01)
*G06F 3/0482* (2013.01)

(52) U.S. Cl.
CPC ........ *G06F 3/04166* (2019.05); *G06F 1/3265* (2013.01); *G06F 3/0482* (2013.01); *G06F 3/04886* (2013.01)

(58) Field of Classification Search
CPC ............... G06F 3/04166; G06F 3/0482; G06F 3/04886; G06F 1/3265; G06F 1/1643; G06F 1/1626; G06F 1/3218; G06F 1/3262; G06F 1/3287; G06F 3/04842; Y02D 10/00
See application file for complete search history.

(56) References Cited

U.S. PATENT DOCUMENTS

| | | | |
|---|---|---|---|
| 10,261,672 B1* | 4/2019 | Dolbakian | G06F 3/04883 |
| 2007/0136682 A1* | 6/2007 | Stienhans | G06F 9/451 |
| | | | 715/789 |
| 2009/0033343 A1* | 2/2009 | Reynolds | H03K 17/955 |
| | | | 324/688 |
| 2010/0156795 A1* | 6/2010 | Kim | G06F 3/0416 |
| | | | 345/168 |
| 2010/0245289 A1* | 9/2010 | Svajda | G06F 3/0421 |
| | | | 345/175 |
| 2012/0140255 A1* | 6/2012 | Tanaka | G06F 3/04817 |
| | | | 358/1.13 |
| 2013/0249856 A1* | 9/2013 | Hsu | G06F 3/041 |
| | | | 345/174 |

* cited by examiner

*Primary Examiner* — Rodney Amadiz
(74) *Attorney, Agent, or Firm* — Zilka-Kotab, P.C.

(57) ABSTRACT

Almost all mobile devices, such as cell phones, tablets, laptops, etc., have touch sensors that enable a user of the device to control various aspects of the device through a touch screen. The touch screen is comprised of a touchable surface and numerous touch sensors positioned across the surface to sense which portion of the surface has been touched by the user. With current touch sensor technology, a touch controller of the device will perform a periodic scan, at some rate, of all of the touch sensors in order to determine which touch sensors have sensed a touch by the user. The present disclosure provides selective activation of the touch sensors for portions of a graphical user interface (GUI) determined to have user-selectable input elements, for providing power savings on the mobile device.

18 Claims, 13 Drawing Sheets

SELECTIVE TOUCH SENSOR ACTIVATION FOR POWER SAVINGS

TECHNICAL FIELD

The present disclosure relates to touch enabled devices.

BACKGROUND

Almost all mobile devices, such as cell phones, tablets, laptops, etc., have touch sensors that enable a user of the device to control various aspects of the device through a touch screen. The touch screen is comprised of a touchable surface and numerous touch sensors positioned across the surface to sense which portion of the surface has been touched by the user. With current touch sensor technology, a touch controller of the device will perform a periodic scan, at some rate, of all of the touch sensors in order to determine which touch sensors have sensed a touch by the user.

However, since the scan of each touch sensor consumes some amount of device power p, the total power P consumed by each periodic scan can be thought of asp multiplied by the number of touch sensors for the touchable surface. Moreover, touch sensitivity can be increased by either increasing a number of touch sensors positioned across the surface of the device, or by increasing a rate at which the touch controller scans the touch sensors. In either case, this increased touch sensitivity also increases power consumption. In mobile devices where power savings is often desired (e.g. to extend battery life), adapting the touch capabilities of a mobile device may be one way to decrease power consumption associated with the touch screen.

There is a need for addressing these issues and/or other issues associated with the prior art.

SUMMARY

A method, computer readable medium, and system are disclosed to provide selective touch sensor activation. The selective touch sensor activation may be provided using a touch control interface to a touch controller of a mobile device. In use, one or more portions of a graphical user interface (GUI) having input elements is identified. Further, touch sensors are selectively activated for the one or more portions of the GUI having the input elements.

DETAILED DESCRIPTION

Almost all mobile devices, such as cell phones, tablets, laptops, etc., have touch sensors that enable a user of the device to control various aspects of the device through a touch screen. The touch screen is comprised of a touchable surface and numerous touch sensors positioned across the surface to sense which portion of the surface has been touched by the user. With current touch sensor technology, a touch controller of the device will perform a periodic scan, at some rate, of all of the touch sensors in order to determine which touch sensors have sensed a touch by the user. The present disclosure provides selective activation of the touch sensors for portions of a graphical user interface (GUI) determined to have user-selectable input elements, for providing power savings on the mobile device.

Figure 1A:
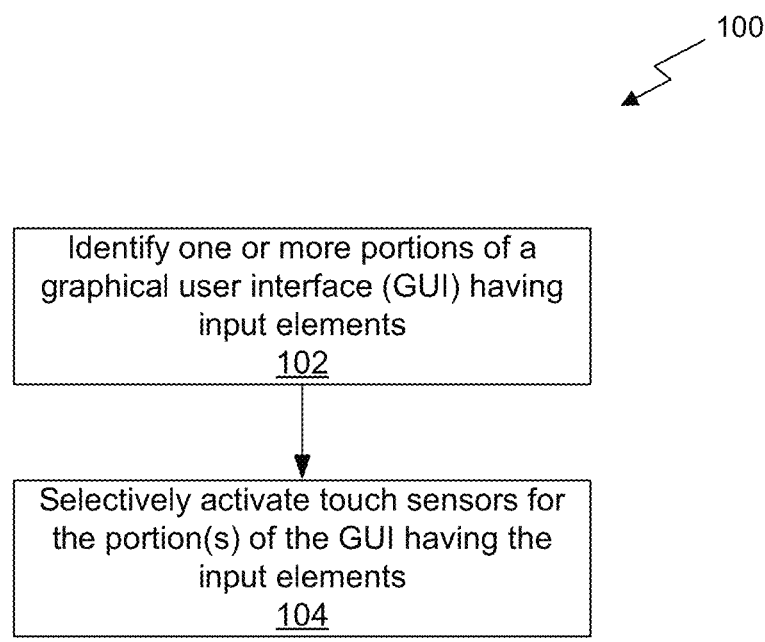
FIG. 1A illustrates a flowchart of a method for selective activation of touch sensors, in accordance with an embodiment.

FIG. 1A illustrates a flowchart of a method 100 for selective activation of touch sensors, in accordance with an embodiment. The method 100 may be performed in the context of a processing unit and/or by a program, custom circuitry, or by a combination of custom circuitry and a program. For example, the method 100 may be executed by a GPU (graphics processing unit), CPU (central processing unit), or any processor described below. Furthermore, persons of ordinary skill in the art will understand that any system that performs method 100 is within the scope and spirit of embodiments of the present disclosure.

In operation 102, one or more portions of a graphical user interface (GUI) having input elements is identified. In the present description, the GUI is either displayed on a touch screen of a mobile device or rendered for display on the touch screen of the mobile device. The GUI may be output from any application or operating system executing on, or executing remote from, the mobile device. For example, the application may be a movie application for presenting a movie to a user of the mobile device, a messaging application for enabling the user to send and receive instant messages, an email application for enabling the user to send and receive email messages, etc. In any case, the input elements are elements capable of being selected by a user of the mobile device via touch navigation when displayed on the touch screen of the mobile device, for the purpose of causing the application to perform some action or for inputting to the application some data.

In the context of the present description, the portion(s) of the GUI having the input elements may refer to area(s) of the GUI having the input elements. For example, the portion(s)

may be referenced by coordinates in screen space. As an option, the portion(s) of the GUI that are identified may be those corresponding to all input elements of the GUI. As another option, the portion(s) of the GUI that are identified may be those corresponding to a subset of all input elements of the GUI, where the subset may be selected based on historical usage statistics (i.e. with commonly used input elements being selected, as determined based on some predefined threshold).

In an embodiment, the portion(s) of the GUI having the input elements may be identified by information provided by the application. For example, the application may utilize an application programming interface (API) to communicate the information for use by the method 100. The information may indicate the portion(s) of the GUI having the input elements via on-screen coordinates.

In another embodiment, the portion(s) of the GUI having the input elements may be identified using a profile stored for the application. The profile may be preconfigured manually, as an option. The profile may store an indication of each GUI capable of being output by the application (e.g. by GUI identifier), as well as an indication of the portion(s) of the GUI having the input elements. In this embodiment, information may be retrieved from the operating system of the mobile device to determine the GUI displayed or rendered for display, and then the indication of the portion(s) of the GUI having the input elements may be retrieved from the profile.

In operation 104, touch sensors are selectively activated for the portion(s) of the GUI having the input elements. In particular, the touch sensors that are activated may be those located on areas of the touch screen displaying the portion(s) of the GUI having the input elements. In this way, touch-based selection of the input elements may be enabled for the user of the mobile device. Remaining touch sensors (i.e. those located on other areas of the touch screen) may be deactivated at least temporarily.

In an embodiment, the touch sensors may be activated by maintaining a "normal" (e.g. default) scan rate by the touch controller for those touch sensors, or even by increasing the "normal" scan rate for those touch sensors. The remaining touch sensors may be deactivated by preventing the touch controller from scanning those remaining touch sensors, or by reducing the "normal" scan rate for those remaining touch sensors. This selective activation of the touch sensors, as described above, may be provided while the GUI is being displayed by the mobile device.

In an embodiment, the different scan rates mentioned above may be provided by programming the touch controller to provide the different scan rates for the different portions of the touch screen. In another embodiment, the different scan rates may be provided using two touch controllers of the mobile device—one touch controller responsible for scanning the activated touch sensors (e.g. scanning at the higher rate) and the other touch controller responsible for scanning the deactivated touch sensors (e.g. scanning at the lower rate).

By selectively activating only the touch sensors associated with the portion(s) of the GUI having the input elements, and thus adapting the touch capabilities of the mobile device based on the GUI, power savings on the mobile device may be provided while still enabling functionality of the GUI. The amount of power savings realized may be a function of a number of the touch sensors that are deactivated, or in particular the number of scans that are otherwise eliminated for the touch screen. Moreover, the method 100 may be repeated for each GUI displayed, or rendered for display, on the mobile device, to provide continuous power savings for the mobile device.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
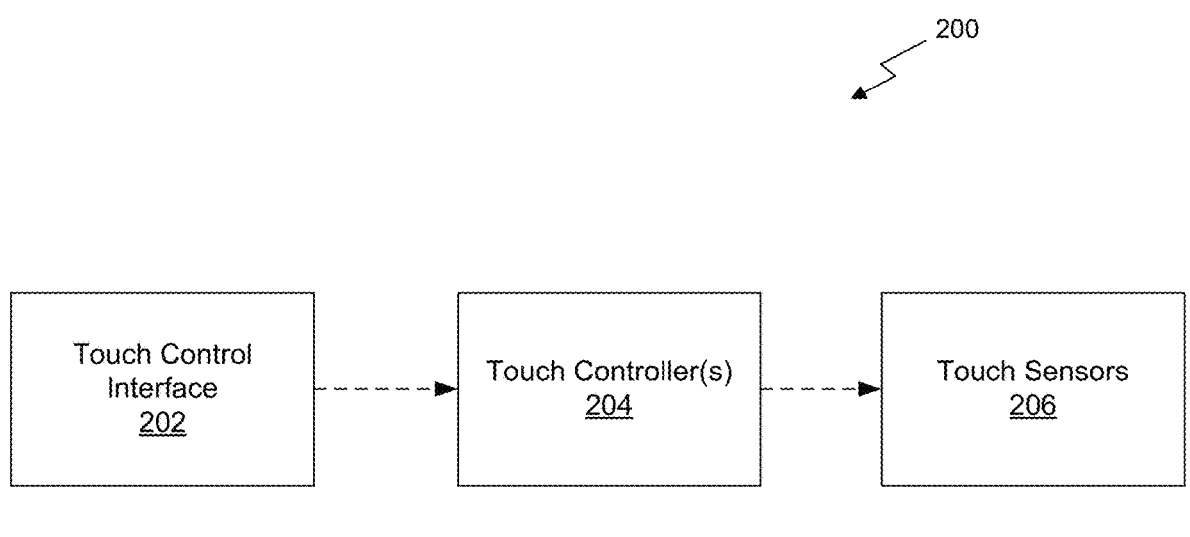
FIG. 1B illustrates a block diagram of a system for selective activation of touch sensors, in accordance with an embodiment.

FIG. 1B illustrates a block diagram of a system 200 for selective activation of touch sensors, in accordance with an embodiment. In one embodiment, the system 200 may be a sub-system of a mobile device of a user. The system 200 may provide power savings for the mobile device, as described below.

As shown, the system 200 includes a touch control interface 202 that communicates with one or more touch controllers 204. The touch control interface 202 may be a computer program or may be implemented in hardware for interfacing with the touch controllers 204. Of course, in another embodiment (not shown), the touch controller(s) 204 may be configured to provide the functionality of the touch control interface 202 described below. In any case, the touch control interface 202 is operable to perform the method 100 of FIG. 1A.

As also shown, the system 200 includes the touch controller(s) 204 which scan, at some given scan rate, touch sensors 206 utilized by a touch screen of the mobile device. The scan rate may be instructed to the touch controller(s) 204 by the touch control interface 202.

Generally, the touch sensors 206 are hardware devices that detect touch by the user. Unlike a button, for example, touch sensors 206 are typically more sensitive, and are often able to respond differently to different kinds of touch, such as tapping, swiping and pinching. Each user touch that a touch sensor detects results in a signal being sent to a processing unit and/or software that processes the signal to determine the intended input of the user and to respond accordingly.

There are two common types of touch sensors 206. The first, a capacitive touch sensor, includes a sensor electrode that is connected to a measurement circuit where the capacitance is measured periodically. The output capacitance will increase if a conductive object (e.g. user's finger) touches or approaches the sensor electrode. The measurement circuit will detect the change in the capacitance and convert it into the aforementioned signal. The second type of touch sensors is a resistant touch sensor, which has a top film that flexes inward upon pressure by an external source (e.g. user's finger) to make contact with a bottom film. This contact results in a voltage drop and the point of contact creates a voltage divider network in the X-Y directions. The voltage as well as the changes in the voltage are detected and the position of the touch where the pressure is applied is calculated based on the X-Y coordinates of the touch, and this information is used to generate the aforementioned signal.

As noted above, the touch controller(s) 204 scan, at some given scan rate, the touch sensors 206. This scan may involve retrieving a signal from each of the touch sensors 206 that indicates whether the touch sensor 206 has sensed touch contact by the user. The scan may be performed sequentially (e.g. line by line) across the touch sensors 206, or in some other pattern.

In other embodiments, the scan may be operable to simultaneously retrieve signals across multiple of the touch sensors 206. In any case, each of the touch sensors 206 is in communication with a touch controller 204 (e.g. by electrical connection or some other means). It should be noted that the touch controller(s) 204 may be implemented in hardware and electrically coupled to each of the touch sensors 206, and/or may be implemented in software. The touch controller(s) 204 may be further configured to use the signals obtained from the touch sensors 206 to determine a position (coordinates) of the user's touch on the touch screen (e.g. by interpolation of the signals). This position may then be provided to an application outputting the displayed GUI to determine the intended input of the user and to respond accordingly.

During use of the system 200, the touch control interface 202 identifies portions of a GUI having input elements. The GUI may be provided by an application, which may be installed on the mobile device or installed on another device and in communication with the mobile device over a network. As another option, the GUI may be provided by an operating system of the mobile device.

In an embodiment, the portion(s) of the GUI having the input elements may be identified by information provided to the touch control interface 202 by the application or operating system. For example, the application may utilize an application programming interface (API) to communicate the information to the touch control interface 202. Optionally, the information may be provided proactively by the application or operating system when a new GUI is rendered for display, or otherwise displayed, or may be provided by the application or operating system upon request by the touch control interface 202 (e.g. responsive to a newly displayed or rendered GUI).

In another embodiment, the portion(s) of the GUI having the input elements may be identified by the touch control interface 202 using a profile stored for the application and/or operating system. The profile may be stored in memory of the mobile device. The profile may store an indication of each GUI capable of being output by the application and/or operating system (e.g. by GUI identifier), as well as an indication of the portion(s) of the GUI having the input elements. The touch control interface 202 may retrieve information from the operating system of the mobile device to determine the GUI displayed or rendered for display, and then the touch control interface 202 may retrieve from the profile the indication of the portion(s) of the determined GUI having the input elements.

Once the touch control interface 202 identifies the portions of the GUI having input elements, the touch control interface 202 determines which of the touch tensors 206 to activate. In one embodiment, the touch sensors that are activated may be one or more of the touch sensors 206 located on areas of the touch screen displaying the portion(s) of the GUI having the input elements. Remaining ones of the touch sensors 206 (i.e. those located on other areas of the touch screen) may be deactivated at least temporarily.

The touch control interface 202 further indicates (e.g. signals, etc.) to the touch controller(s) 204 which of the touch sensors 206 to activate (as determined by the touch control interface 202). For example, the touch control interface 202 may configure (e.g. program, etc.) the touch controller(s) 204 to activate the determined touch sensors 206.

In response, the touch controller(s) 204 activate the touch sensors 206 indicated by the touch control interface 202. In an embodiment, the touch sensors 206 may be activated by maintaining a "normal" scan rate by the touch controller(s) 204 for the indicated touch sensors 206, or even by increasing the "normal" scan rate for those touch sensors 206. The remaining touch sensors 206 (not indicated as to be activated) may be deactivated by the touch controller(s) 204 at least temporarily not scanning those remaining touch sensors 206, or by reducing the "normal" scan rate for those remaining touch sensors 206. This selective activation of the touch sensors 206, as described above, may be provided by the touch controller(s) 204 while the GUI is being displayed by the mobile device.

In one embodiment, the system 200 may include a single touch controller 204, in which case the single touch controller 204 may be configurable by the touch control interface 202 to provide (e.g. operate at) the different scan rates for the activated versus deactivated touch sensors 206. In another embodiment, the system 200 may include at least two touch controllers 204, in which case at least a first one of the two touch controllers 204 may be configurable by the touch control interface 202 to provide a first scan rate for the activated touch sensors 206 while at least a second one of the two touch controllers 204 may be configurable by the touch control interface 202 to provide a second scan rate (or no scanning) for the deactivated touch sensors 206.

Once the touch controller(s) 204 are configured by the touch control interface 202, the touch controller(s) 204 will operate accordingly to selectively activate the determined touch sensors 206. The touch controller(s) 204 may operate in this manner until they are reconfigured by the touch control interface 202 for a newly displayed or rendered GUI.

Figure 2A:
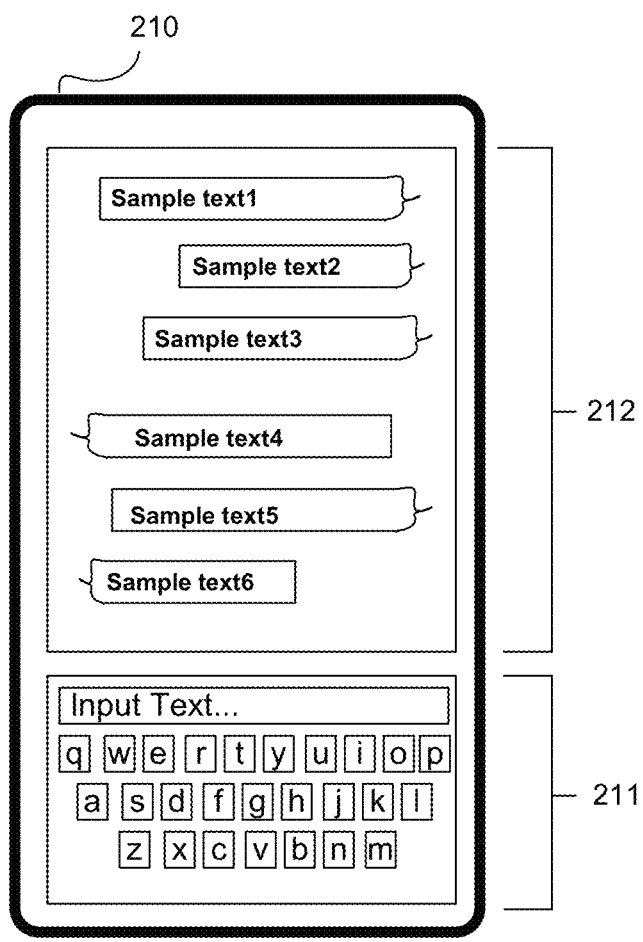
FIG. 2A illustrates a mobile device displaying a messaging GUI to which selective activation of touch sensors is provided, in accordance with an embodiment.

FIG. 2A illustrates a mobile device 210 displaying a messaging GUI to which selective activation of touch sensors is provided, in accordance with an embodiment. The messaging GUI may be provided by a messaging application of the mobile device 210, such as a text messaging application.

As shown, the messaging GUI displayed on a touch screen of the mobile device 210 includes a first portion 211 with input elements and a second portion 212 without input elements. The input elements of the first portion 211 include a virtual keyboard, whereby text entered by a user of the mobile device 210 via the virtual keyboard is sent to a recipient and displayed in the second portion 212 of the GUI. The second portion 212 of the GUI also displays messages received by the mobile device 210 from the recipient.

In the present example, the system 200 of FIG. 1B may operate to activate the first portion 211 of the GUI and deactivate the second portion 212 of the GUI.

In an exemplary implementation, when a user is typing a text message, the virtual keyboard is displayed at the lower half of the touch screen. The user will frequently touch the screen at the location where the keyboard is displayed (portion 211), but he is less likely to touch the top half of the screen (portion 212, which might infrequently be touched, e.g. to copy some text or an entire message). Accordingly, the touch sensors 206 associated with the first portion 211 of the GUI may be scanned by the touch controller(s) 204 at a higher rate (or at the 'normal' rate) than touch sensors 206 associated with the remaining portion 212 of the GUI. The touch sensors 206 associated with the remaining portion 212 of the GUI may be scanned at a lower (than 'normal') rate.

Figure 2B:
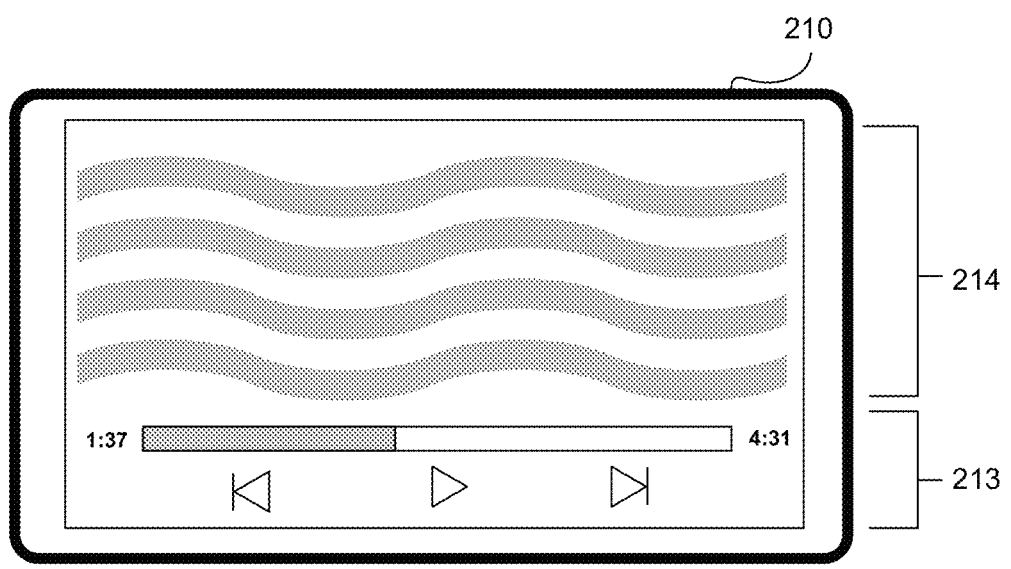
FIG. 2B illustrates a mobile device displaying a movie player GUI to which selective activation of touch sensors is provided, in accordance with an embodiment.

FIG. 2B illustrates a mobile device 210 displaying a movie player GUI to which selective activation of touch sensors is provided, in accordance with an embodiment. The movie player GUI may be provided by a movie player application of the mobile device 210.

As shown, the movie player GUI displayed on a touch screen of the mobile device 210 includes a first portion 213 with input elements and a second portion 214 without input elements. The input elements of the first portion 213 include button controls for controlling a movie being played by the movie application and displayed through the second portion 214 of the movie player GUI. The button controls include a play/pause button, a rewind button, and a fast forward button, for example.

In the present example, the system 200 of FIG. 1B may operate to activate the first portion 213 of the GUI and deactivate the second portion 213 of the GUI.

Figure 2C:
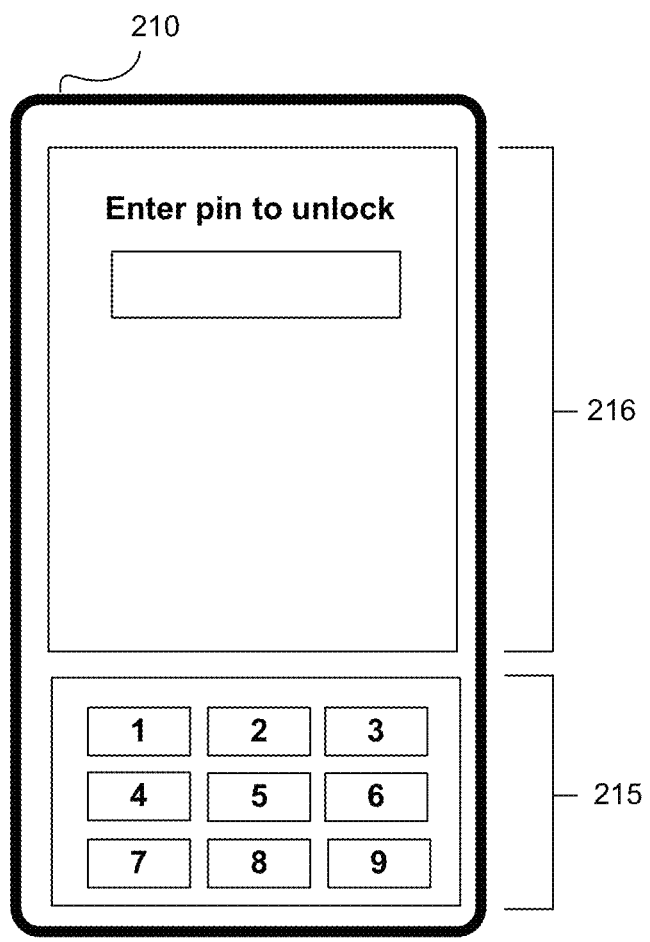
FIG. 2C illustrates a mobile device displaying a password entry GUI to which selective activation of touch sensors is provided, in accordance with an embodiment.

FIG. 2C illustrates a mobile device 210 displaying a password entry GUI to which selective activation of touch sensors is provided, in accordance with an embodiment. The password entry GUI may be provided by any application of the mobile device 210, or for example a web application, requiring entry of a password by a user of the mobile device 210.

As shown, the password entry GUI displayed on a touch screen of the mobile device 210 includes a first portion 215 with input elements and a second portion 116 without input elements. The input elements of the first portion 215 include a numeric keypad allowing numeric text to be input by the user. The second portion 116 of the GUI displays the numeric text, or a hidden version of the numeric text, input by the user via the numeric keypad.

In the present example, the system 200 of FIG. 1B may operate to activate the first portion 215 of the GUI and deactivate the second portion 216 of the GUI.

Figure 2D:
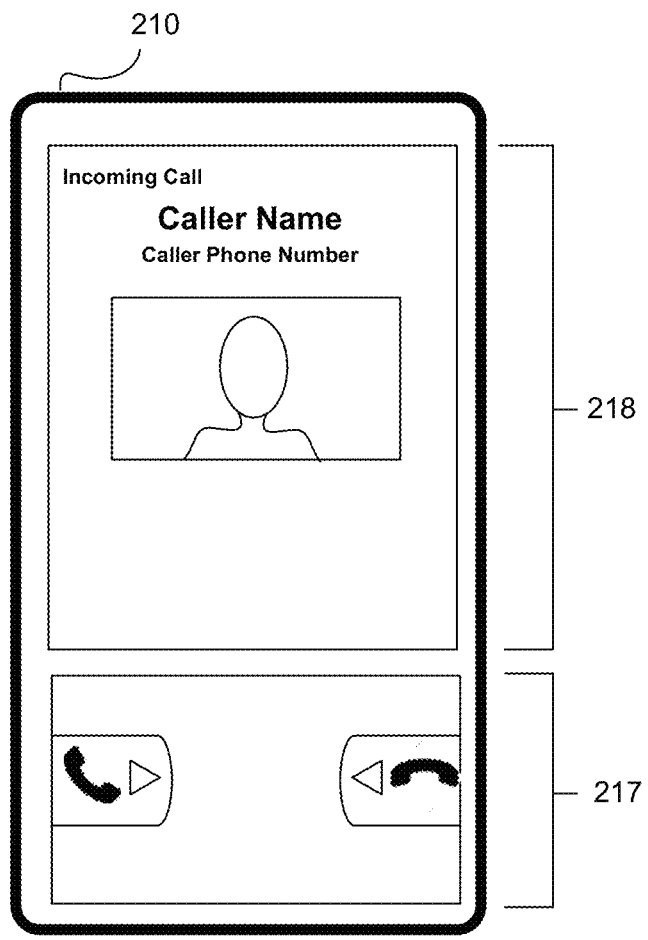
FIG. 2D illustrates a mobile device displaying an incoming call GUI to which selective activation of touch sensors is provided, in accordance with an embodiment.

FIG. 2D illustrates a mobile device 210 displaying an incoming call GUI to which selective activation of touch sensors is provided, in accordance with an embodiment. The incoming call GUI may be provided by telephone call application of the mobile device 210.

As shown, the incoming call GUI displayed on a touch screen of the mobile device 210 includes a first portion 217 with input elements and a second portion 218 without input elements. The input elements of the first portion 217 include sliding button controls, one for answering an incoming telephone call and one for declining the incoming telephone call. The second portion 218 of the GUI displays information related to the caller.

In the present example, the system 200 of FIG. 1B may operate to activate the first portion 217 of the GUI and deactivate the second portion 218 of the GUI.

Figure 2E:
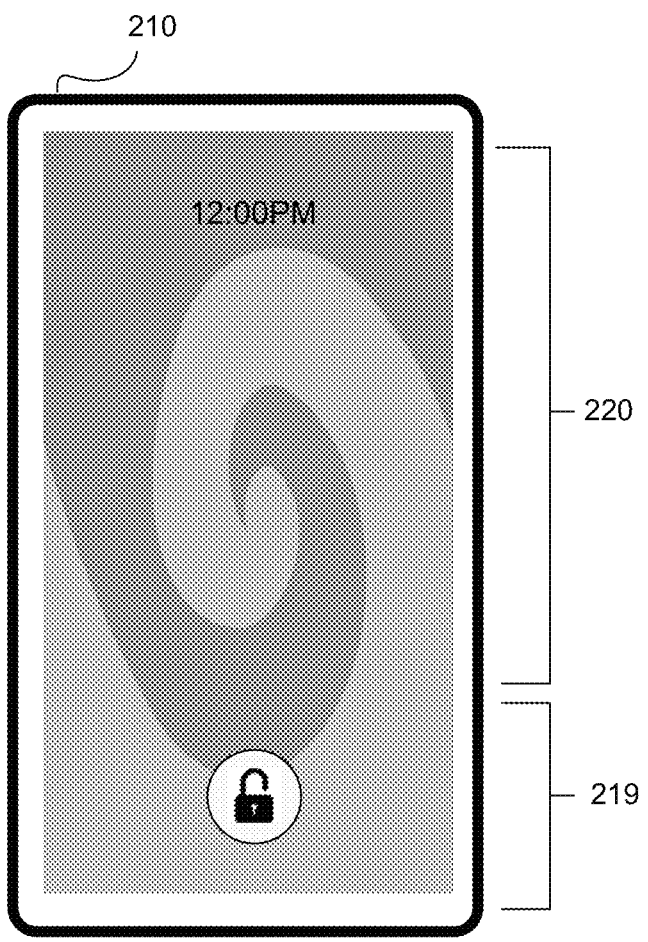
FIG. 2E illustrates a mobile device displaying a screen unlock GUI to which selective activation of touch sensors is provided, in accordance with an embodiment.

FIG. 2E illustrates a mobile device 210 displaying a screen unlock GUI to which selective activation of touch sensors is provided, in accordance with an embodiment. The screen unlock GUI may be provided by an operating system of the mobile device 210.

As shown, the screen unlock GUI displayed on a touch screen of the mobile device 210 includes a first portion 219 with input elements and a second portion 220 without input elements. The input elements of the first portion 219 include a sliding button control for unlocking the touch screen of the mobile device 210. The second portion 218 of the GUI displays an image preconfigured for the screen unlock GUI.

In the present example, the system 200 of FIG. 1B may operate to activate the first portion 219 of the GUI and deactivate the second portion 220 of the GUI.

The embodiments described above relate to devices with touch screen capabilities. Typically, these devices are mobile devices, such as mobile phones, tablets, laptops, etc. Mobile devices are increasingly using graphics processing units (GPUs) and/or other parallel processing units (PPUs) for various processing tasks which are not necessarily limited to graphics-specific processing tasks. More details regarding an exemplary PPU architecture for a mobile device are provided below.

Parallel Processing Architecture

Figure 3:
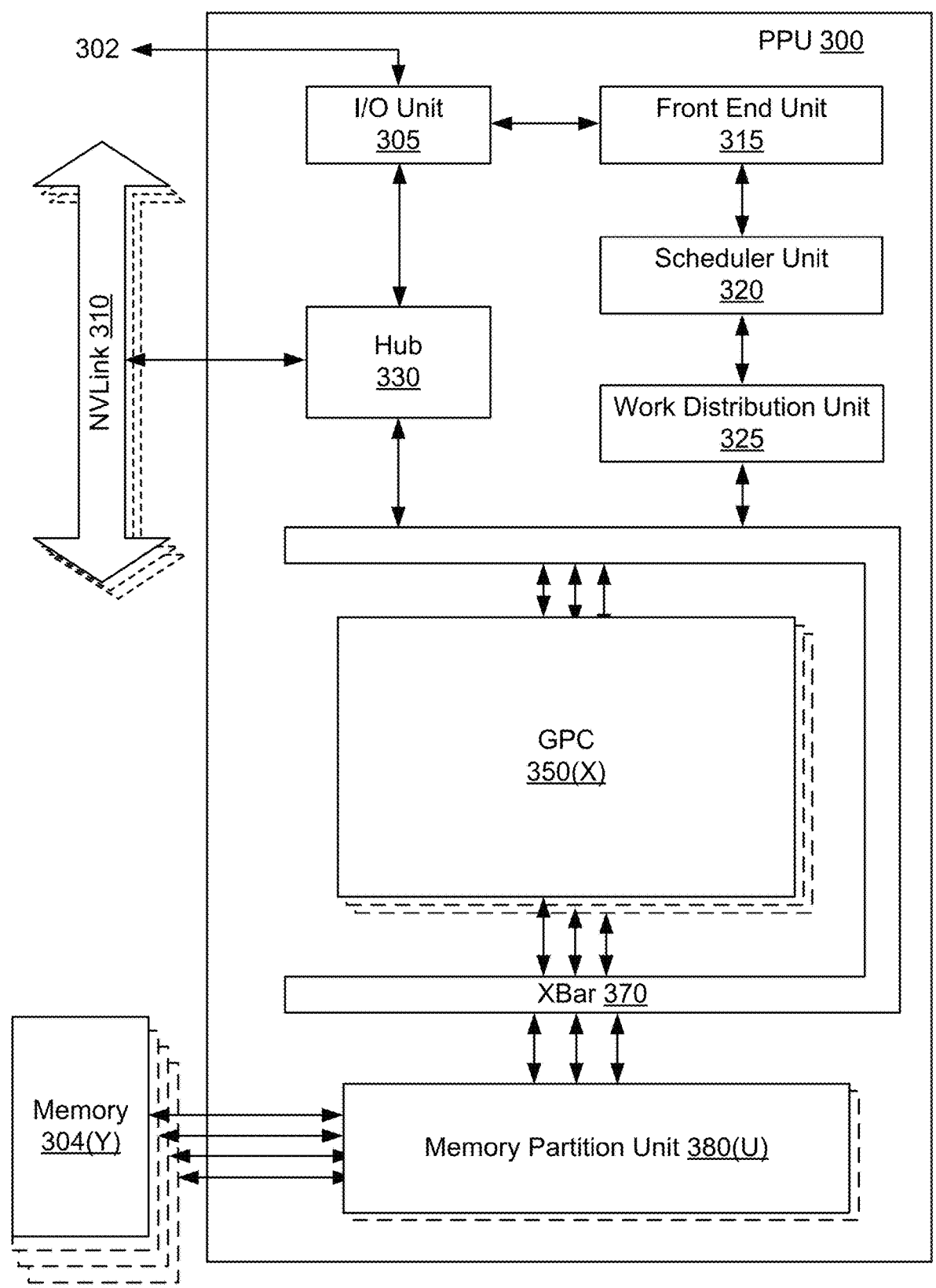
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 304 or CPU via the NVLink 310. In an embodiment, the PPU 300 includes a number U of memory partition units 380 that is equal to the number of separate and distinct memory devices 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
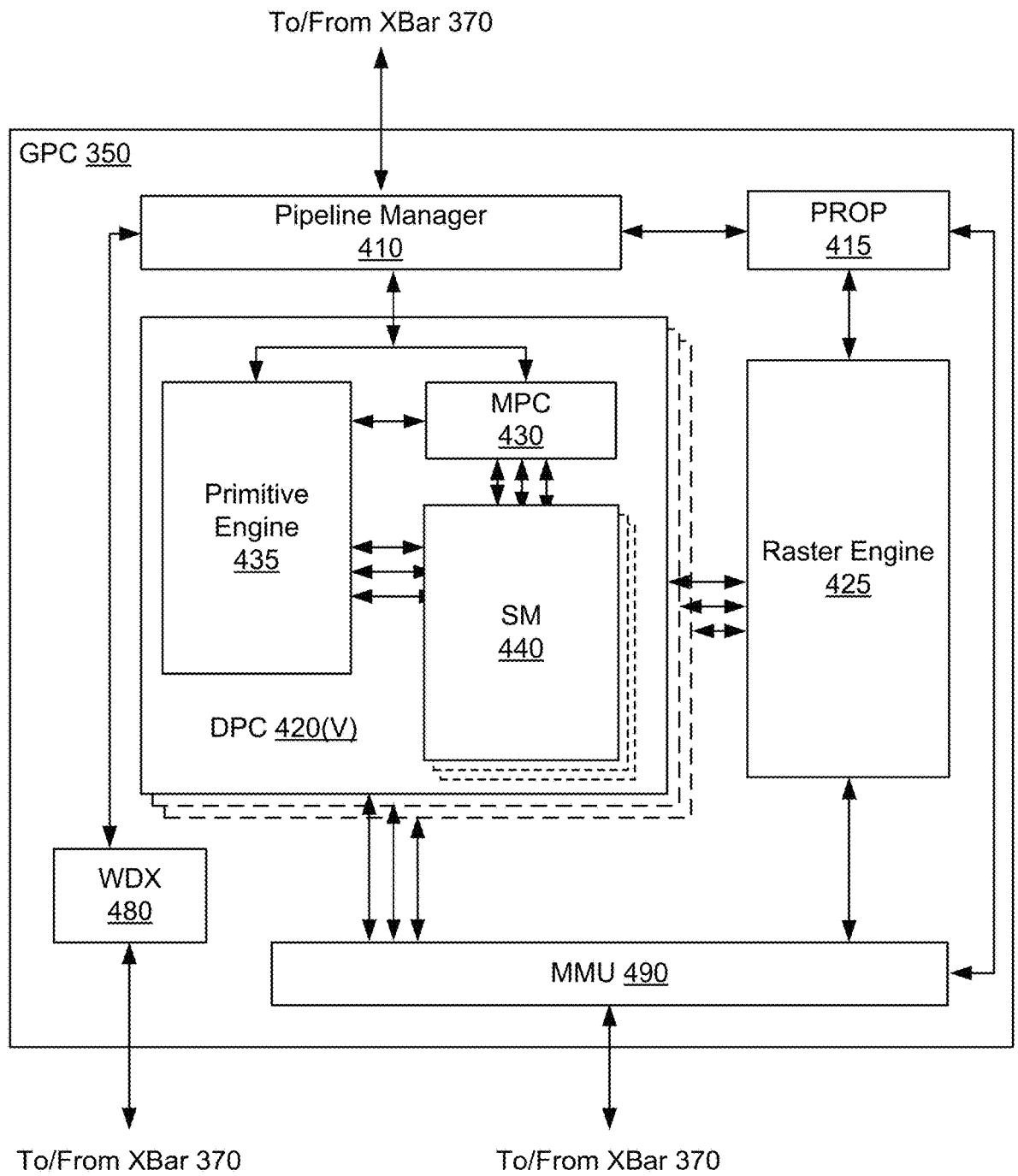
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
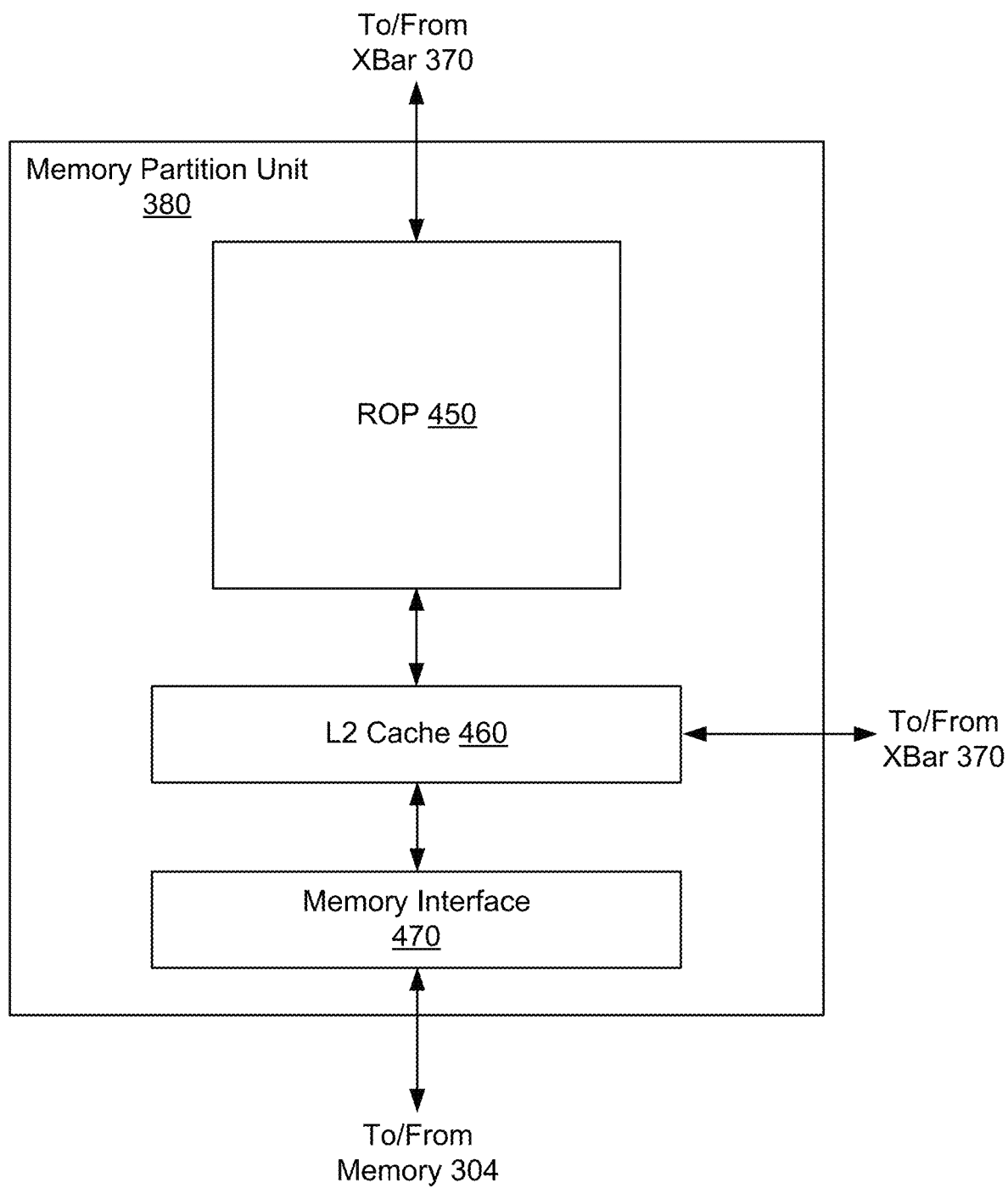
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
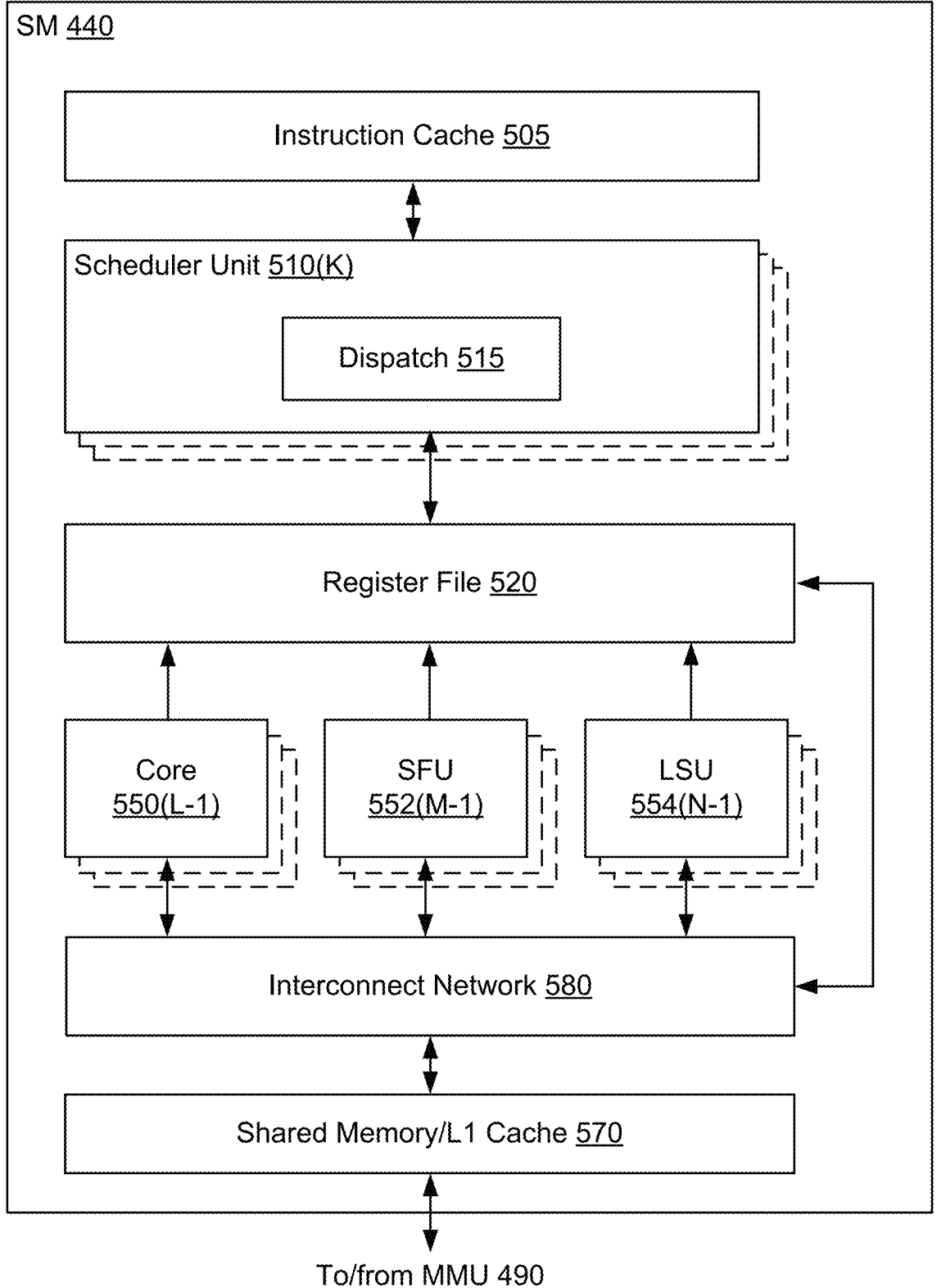
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (3-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel compu-tation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Figure 5B:
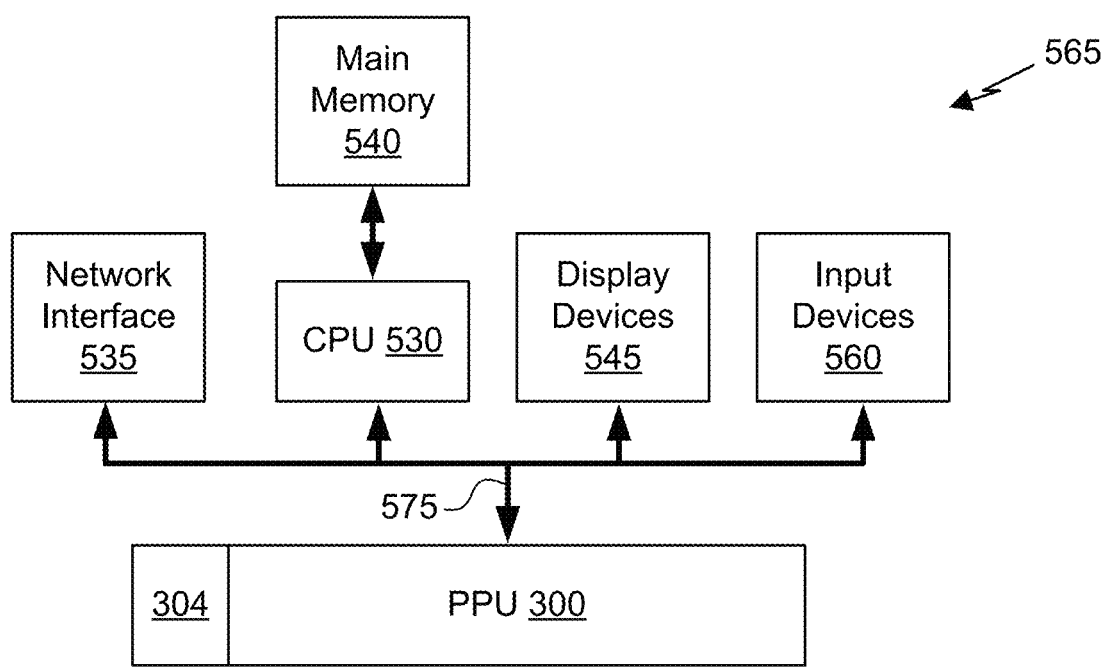
FIG. 5B illustrates an exemplary system in which the various architecture and/or functionality of the various previous embodiments may be implemented.

FIG. 5B illustrates an exemplary system 565 in which the various architecture and/or functionality of the various previous embodiments may be implemented. The exemplary system 565 may be configured to implement the method 100 shown in FIG. 1A.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, PPU 300 with memory 304, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (e.g., pixel data for each of the pixels of the display).

An application writes model data for a scene (e.g., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
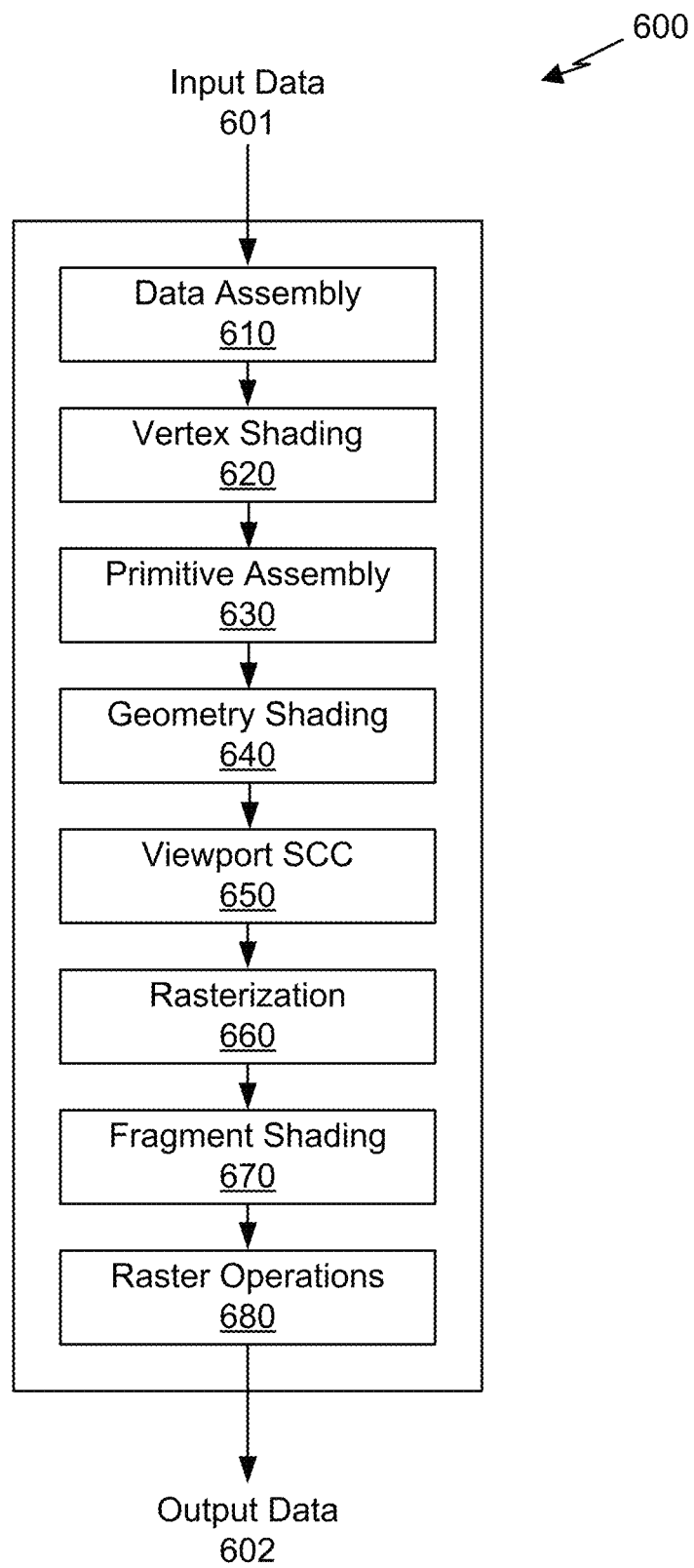
FIG. 6 is a conceptual diagram of a graphics processing pipeline implemented by the PPU of FIG. 3, in accordance with an embodiment.

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440).

The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

What is claimed is:

1. A method, comprising:
   identifying one or more portions of a graphical user interface (GUI) having input elements and being displayed by a device, wherein the one or more portions of the GUI having the input elements include those portions corresponding to a subset of all input elements of the GUI, wherein the subset is selected based on historical usage statistics; and
   during display of the GUI, selectively activating touch sensors for the one or more portions of the GUI having the input elements while the GUI is being displayed by the device.

2. The method of claim 1, wherein the identifying and the selectively activating are performed by a touch controller interface interfacing a touch controller.

3. The method of claim 2, wherein the touch controller interface causes the touch controller to selectively activate the touch sensors for the one or more portions of the GUI having the input elements.

4. The method of claim 1, wherein the input elements are selectable by a user via the touch screen of the device for the purpose of causing an application to perform an action or for inputting data to the application.

5. The method of claim 1, wherein the one or more portions of the GUI having the input elements are referenced by coordinates in screen space.

6. The method of claim 1, wherein the one or more portions of the GUI having the input elements are identified by information provided by an application associated with the GUI.

7. The method of claim 1, wherein the one or more portions of the GUI having the input elements are identified using a profile stored for an application associated with the GUI.

8. The method of claim 1, wherein the touch sensors that are activated include those located on areas of a touch screen displaying the one or more portions of the GUI having the input elements.

9. The method of claim 8, wherein remaining touch sensors are deactivated at least temporarily.

10. The method of claim 9, wherein the remaining touch sensors are deactivated by reducing a scan rate for the remaining touch sensors.

11. The method of claim 9, wherein the remaining touch sensors are deactivated by preventing scanning of the remaining touch sensors.

12. The method of claim 8, wherein the touch sensors are activated by maintaining a scan rate for the touch sensors or by increasing a scan rate for the touch sensors.

13. The method of claim 1, wherein selectively activating the touch sensors for the one or more portions of the GUI having the input element results in power savings.

14. The method of claim 1, wherein a first touch controller activates the touch sensors for the one or more portions of the GUI having the input elements by scanning the touch sensors at a first rate, and wherein a second touch controller deactivates remaining touch sensors by scanning the remaining touch sensors at a second rate that is lower than the first rate.

15. The method of claim 1, wherein the subset includes commonly used input elements as determined based on a predefined threshold.

16. The method of claim 1, wherein touch sensors for one or more other portions of the GUI having other input elements that are displayed are not activated, wherein the other input elements are not included in the selected subset of all input elements.

17. A system, comprising:
   memory storing instructions; and
   a processor operable to execute the instructions to perform a method comprising:
      identifying one or more portions of a graphical user interface (GUI) having input elements and being displayed by a device, wherein the one or more portions of the GUI having the input elements include those portions corresponding to a subset of all input elements of the GUI, wherein the subset is selected based on historical usage statistics; and
      during display of the GUI, selectively activating touch sensors for the one or more portions of the GUI having the input elements while the GUI is being displayed by the device.

18. A non-transitory computer-readable media storing computer instructions which when executed by one or more processors cause the one or more processors to perform a method comprising:
   identifying one or more portions of a graphical user interface (GUI) having input elements and being displayed by a device, wherein the one or more portions of the GUI having the input elements include those portions corresponding to a subset of all input elements of the GUI, wherein the subset is selected based on historical usage statistics; and
   during display of the GUI, selectively activating touch sensors for the one or more portions of the GUI having the input elements while the GUI is being displayed by the device.

* * * * *